(12) United States Patent
Guan et al.

(10) Patent No.: US 9,250,638 B1
(45) Date of Patent: Feb. 2, 2016

(54) VOLTAGE REGULATOR SLEEP CONTROL IN DROPOUT MODE

(71) Applicant: LINEAR TECHNOLOGY CORPORATION, Milpitas, CA (US)

(72) Inventors: Peter Jie Guan, Dublin, CA (US); Hao Zhao, San Francisco, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 198 days.

(21) Appl. No.: 13/922,191

(22) Filed: Jun. 19, 2013

Related U.S. Application Data

(60) Provisional application No. 61/754,452, filed on Jan. 18, 2013.

(51) Int. Cl.
*G05F 5/00* (2006.01)
*G05F 1/10* (2006.01)

(52) U.S. Cl.
CPC .................................. *G05F 1/10* (2013.01)

(58) Field of Classification Search
USPC .................. 323/207, 222, 271, 282–285, 299
See application file for complete search history.

(56) References Cited

U.S. PATENT DOCUMENTS

2006/0214647 A1* 9/2006 Ishimaru et al. ............... 323/222
2008/0239774 A1* 10/2008 Canfield et al. ................ 363/127
2013/0162230 A1* 6/2013 Miyamae ....................... 323/271

* cited by examiner

*Primary Examiner* — Nguyen Tran
(74) *Attorney, Agent, or Firm* — McDermott Will & Emery LLP

(57) ABSTRACT

A control circuit for controlling a switching regulator that converts an input voltage to a regulated output voltage. The control circuit has an input-output comparator configured for comparing a difference between the input voltage and the output voltage, and producing a first sleep signal for placing the regulator into a sleep mode, when the regulator operates in a dropout mode, and the difference between the input voltage and the output voltage becomes less than a first predetermined value.

15 Claims, 3 Drawing Sheets

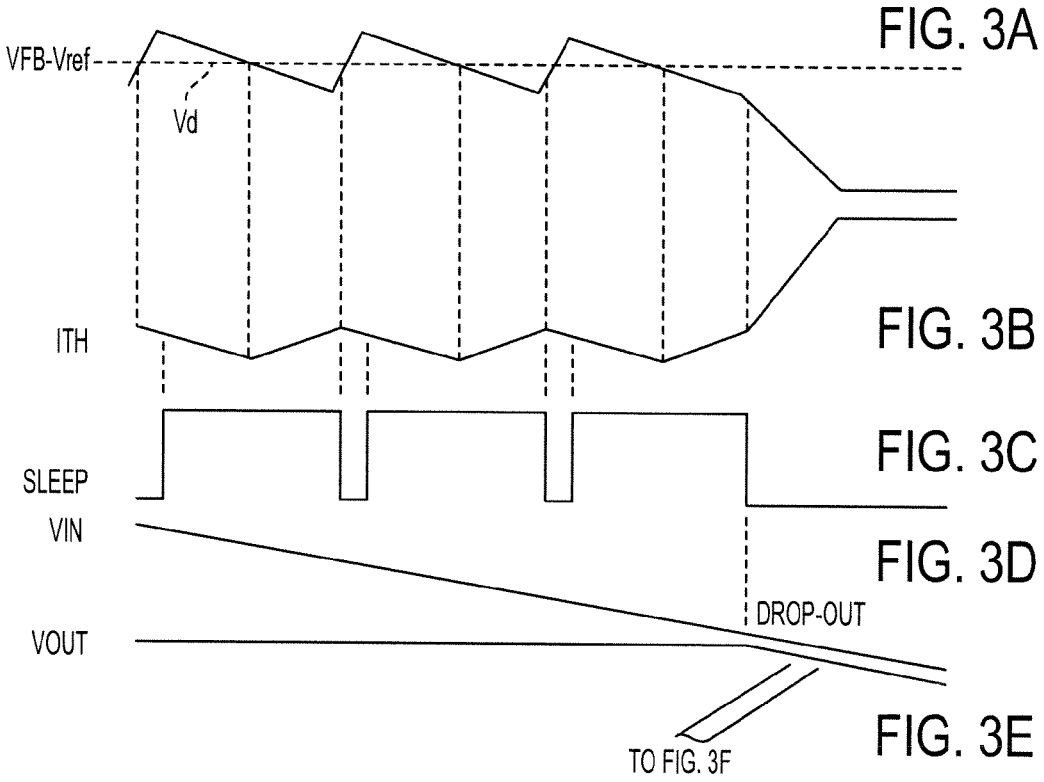
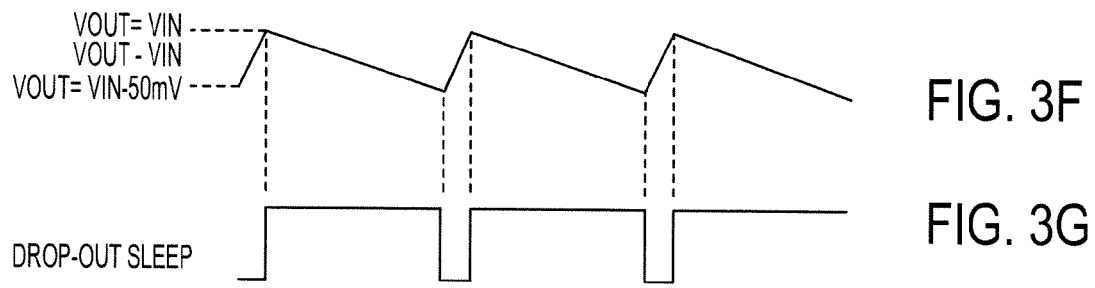

VOLTAGE REGULATOR SLEEP CONTROL IN DROPOUT MODE

This application claims priority of U.S. provisional patent application No. 61/754,452 entitled ULTRA LOW QUIESCENT CURRENT BURST MODE IN DROPOUT OPERATION and filed Jan. 18, 2013.

TECHNICAL FIELD

This disclosure relates to power supply systems, and more particularly, to a switching regulator sleep control scheme for reducing quiescent current of a voltage regulator during a dropout mode.

BACKGROUND ART

A voltage regulator converts an input voltage VIN from an input power supply to produce a regulated output voltage VOUT. For conserving power and extending the life of the input power supply, it is essential to maintain low quiescent current of the voltage regulator. Providing a low level of quiescent current is especially important for battery powered applications.

To reduce quiescent current and extend battery life, a voltage regulator may be placed into a sleep mode during which power supplied to internal circuits is cut or reduced. A conventional voltage regulator monitors its regulated output voltage to determine when it would enter and exit sleep mode. If its output voltage is higher than a pre-programmed regulation point, it would go into a sleep mode. If the output voltage is reduces below the regulation point, the voltage regulator would wake up to recharge the output.

However, this conventional scheme of a sleep mode control would not work in a dropout mode when the input voltage VIN approaches the output voltage VOUT, and a difference between VIN and VOUT becomes less than a dropout voltage, which is the smallest possible difference between VIN and VOUT that allows the regulator to remain inside the regulator's intended operating range. Dropout voltage may vary depending on the load on the regulator, usually increasing at higher load, due to the internal resistance of the regulator's pass transistor and circuitry. Dropout voltage may also vary depending on temperature.

When a difference between VIN and VOUT becomes less than the dropout voltage, the output voltage VOUT starts to drop out of regulation. At that point, the conventional regulator would stay awake all the time because its VOUT is now always below its programmed regulation point.

However, for battery powered applications, it would be desirable to create a new voltage regulator sleep control scheme that would allow a voltage regulator to go into a sleep mode even when the output voltage VOUT has fallen below its programmed regulation point, so as to reduce quiescent current and maximize operational lifetime.

SUMMARY OF THE DISCLOSURE

In accordance with one aspect, the present disclosure offers a novel control circuit for controlling a switching regulator that converts an input voltage at an input node to a regulated output voltage at an output node and includes an inductive element and a switch coupled to the inductive element and controlled to produce the regulated output voltage. The control circuit comprises an input-output comparator configured for comparing a difference between the input voltage and the output voltage, and producing a first sleep signal for placing the regulator into a sleep mode when the regulator operates in a dropout mode, and the difference between the input voltage and the output voltage becomes less than a first predetermined value.

The input-output comparator may be configured for producing a wake up signal for requesting the regulator to exit the sleep mode, when the difference between the input voltage and the output voltage becomes greater than a second predetermined value.

In accordance with another aspect of the disclosure, a sleep comparator may be provided for comparing a current signal representing a load current of the regulator with a first threshold value, and producing a second sleep signal for placing the regulator into a sleep mode, when the current signal is less than the current threshold value.

In accordance with a further aspect of the disclosure, a high threshold comparator may be provided for comparing the current signal with a second current threshold value, and producing an enabling signal for enabling the input-output comparator only when the current signal exceeds the second threshold value.

An error amplifier may be provided for comparing a signal representing the output voltage with a reference value, and producing the current signal supplied to the sleep comparator and the high threshold comparator.

In accordance with a method of the present disclosure, the following steps may be carried out to convert an input voltage into a regulated output voltage using a switching regulator:

controlling a switch of the regulator to produce the regulated output voltage, detecting a difference between the input voltage and the output voltage, and producing a first sleep signal for placing the regulator into a sleep mode, when the regulator operates in a dropout mode, and the difference between the input voltage and the output voltage becomes less than a first predetermined value.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features. In the figures, like reference numerals refer to the same or similar elements.

FIGS. 3A-3G are timing diagrams illustrating operation of the sleep control scheme in FIG. 2.

DETAILED DISCLOSURE OF THE EMBODIMENTS

The present disclosure will be made using specific examples presented below. It will become apparent, however, that the concept of the disclosure is applicable to any voltage regulator having a dropout mode of operation.

Figure 1:
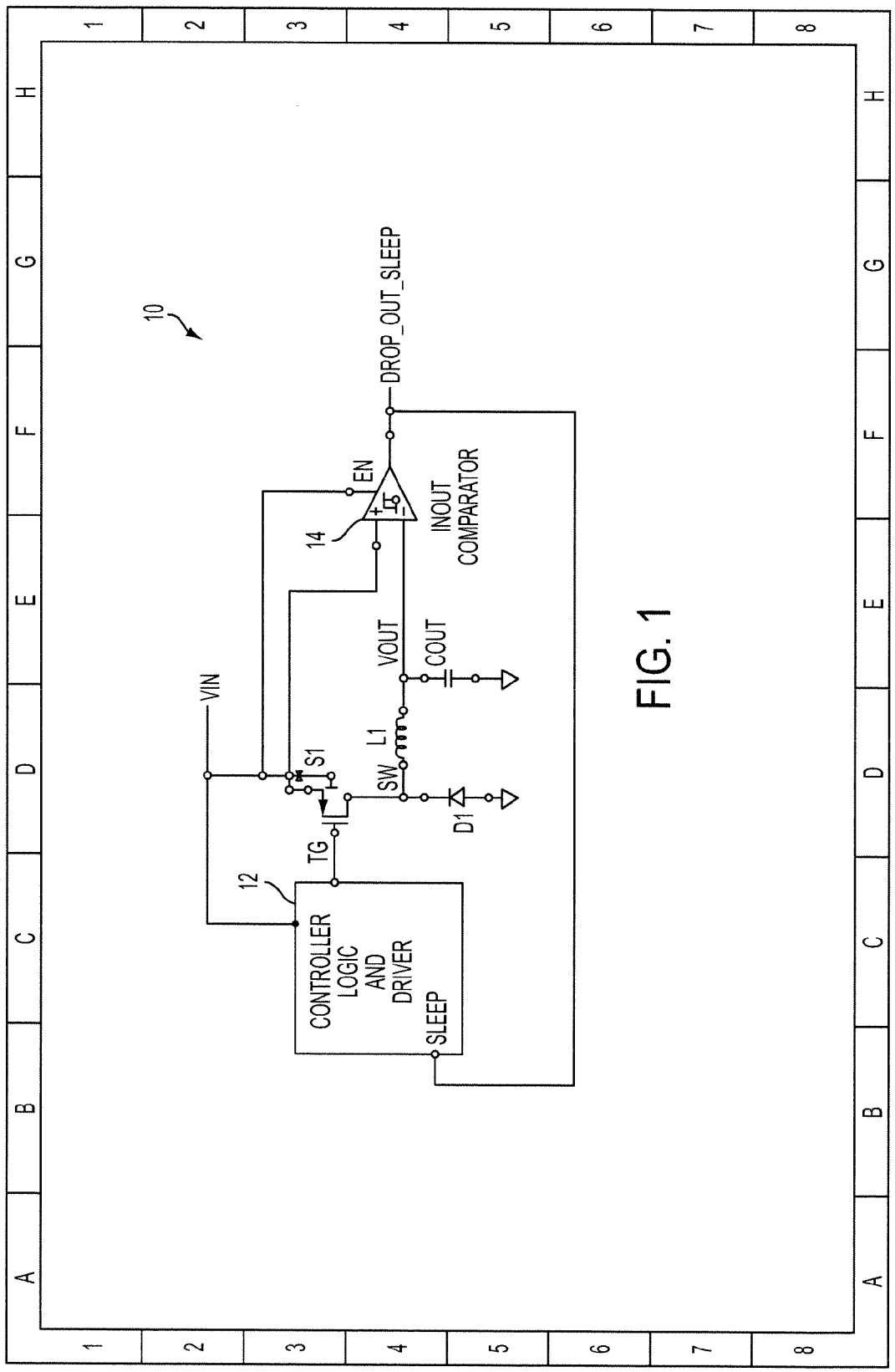
FIG. 1 illustrates an exemplary switching regulator with a sleep control scheme of the present disclosure.

FIG. 1 shows an exemplary buck switching regulator 10 with a sleep mode control scheme of the present disclosure. The regulator 10 converts an input voltage VIN provided at its input node to produce a regulated voltage VOUT at its output node smaller than the input voltage VIN. The regulator 10 includes a pair of switches such as a P-type MOSFET S1 and a diode D1. The input voltage VIN may be supplied to the source and the body of the MOSFET S1. However, instead of the MOSFET S1 and the diode D1, the regulator 10 may employ a pair of any transistors or diodes.

Also, the regulator 10 includes an inductor L1 coupled between the drain of the switch S1 and the output node VOUT, and an output capacitor COUT coupled to the output node VOUT. A controller logic and driver unit 12 is provided to control switching of the switch S1. The controller logic and driver unit 12 may be configured for placing the regulator 10 into a sleep mode during which power supplied to regulator control circuits may be cut or reduced.

An input-output (INOUT) comparator 14 is provided for placing the regulator 10 into a sleep mode even when the regulator 10 operates in a dropout mode. In particular, the INOUT comparator 14 has a non-inverting input for receiving a signal representing the input voltage VIN and an inverting input for receiving a signal representing the output voltage VOUT. For simplicity, FIG. 1 shows that the non-inverting input is coupled to the input node VIN and the inverting input is coupled to the output node VOUT. However, to sense a difference between VIN and VOUT, the INOUT comparator 14 may use any known schemes for detecting the input and output voltages of a voltage regulator. The INOUT comparator 14 may be enabled by the input voltage VIN. For example, a hysteresis comparator may be employed as the INOUT comparator 14.

When the input voltage VIN decreases, it may approach a level of the output voltage VOUT. When the difference between the VIN and VOUT is less than the dropout voltage, the output voltage VOUT will drop out of regulation, and the regulator 10 will operate in a dropout mode. In this mode, a conventional regulator with a sleep mode would stay awake all the time because its VOUT is below its programmed regulation point.

However, when the INOUT comparator 14 detects that the decreasing input voltage VIN is larger than the output VOUT by a value less than a predetermined threshold value, e.g. 50 mV, the INOUT comparator 14 asserts a dropout sleep signal DROP_OUT_SLEEP. This signal is supplied to a SLEEP input of the controller logic and driver unit 12 to instruct the unit 12 to place the voltage regulator 10 into a sleep mode. The threshold value may be less than the dropout voltage to provide the dropout sleep signal when the regulator 10 operates in a dropout mode.

When the difference between the input voltage VIN and the output voltage VOUT increases and reaches the threshold value, the INOUT comparator 14 de-asserts the dropout sleep signal at the SLEEP input of the controller logic and driver unit 12 so as to wake up the voltage regulator 10. The threshold value for waking up the regulator may differ from the threshold value for placing the regulator into a sleep mode.

A difference between VIN and VOUT represents the output load current of the regulator 10. Therefore, instead of detecting a difference between VIN and VOUT, the regulator sleep control scheme of the present disclosure may sense the output current of the regulator 10 directly through the switch S1 or inductor L1.

Hence, the drop out sleep control scheme of the present disclosure allows the regulator to go into a sleep mode when the output voltage VOUT has fallen below its programmed regulation point. As a result, the regulator will operate with very low quiescent current in a power saving mode as long as the output load current demand is low.

Figure 2:
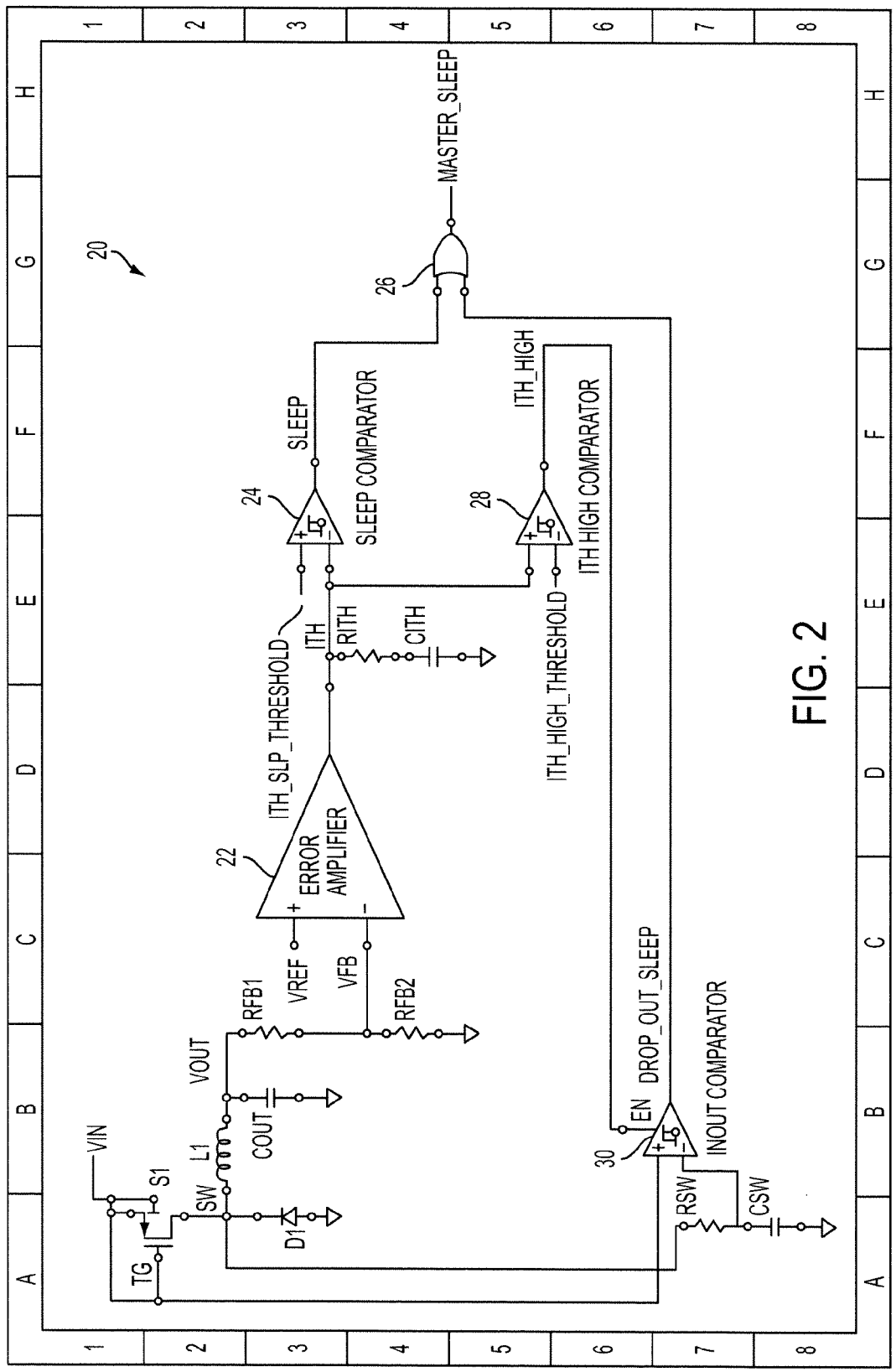
FIG. 2 illustrates an exemplary burst mode switching regulator with a sleep control scheme of the present disclosure.

FIG. 2 illustrates an exemplary Burst-mode buck switching regulator 20 with a sleep control scheme of the present disclosure. The regulator 20 converts an input voltage VIN provided at its input node to produce a regulated voltage VOUT smaller than the input voltage VIN. The regulator 20 includes a pair of switches such as a P-type MOSFET S1 and a diode D1. The input voltage VIN may be supplied to the source and the body of the MOSFET S1. A control signal TG is supplied to the gate of the MOSFET S1 to control its switching performed for producing the regulated output voltage VOUT. The control signal may be produced by a controller (not shown) configured for controlling a switching regulator in a buck mode. Instead of the MOSFET S1 and the diode D1, the regulator 10 may employ a pair of any transistors or diodes.

Also, the regulator 20 includes an inductor L1 coupled between the drain of the switch S1 and the output node VOUT, and an output capacitor COUT coupled to the output node VOUT. Resistors RFB1 and RFB2 coupled to the output node VOUT provide a voltage divider for producing a feedback voltage VFB representing the output voltage VOUT.

An error amplifier 22 is provided to compare the feedback voltage VFB with a reference voltage VREF representing a desired level of the output voltage VOUT. A low pass RC filter composed of resistor RITH and capacitor CITH may be provided at the output of the error amplifier 22 to filter its output signal.

When the switch S1 is switching, input biasing current in the order of tens of mA is produced. At light loads, when almost no output load current is needed, the input biasing current results in the waste of energy. To save energy, the regulator 20 operates in a Burst mode that involves preventing the switch S1 from switching by placing the regulator 20 into a sleep mode when loads are light.

The regulator 20 is controlled to operate in the Burst mode at light loads based on a current threshold (ITH) voltage produced at the output of the error amplifier 22. The ITH voltage may correspond to the output load current of the regulator 22. Lower levels of the ITH voltage indicate lower output load currents, i.e. lighter loads.

As indicated by timing diagrams 3A and 3B, when the feedback voltage VFB rises increasing a difference between VFB and VREF to a level Vd, the ITH voltage falls indicating that the output current reduces. The ITH voltage may be supplied to a non-inverting input of a sleep hysteresis comparator 24 that compares the ITH voltage with a sleep threshold voltage ITH_SLP_THRESHOLD provided at the inverting input of the sleep comparator 24.

When the ITH voltage becomes less than the sleep threshold voltage, the sleep comparator 24 asserts a sleep signal SLEEP (FIG. 3C) that causes an OR gate 26 to produce a master sleep signal MASTER SLEEP supplied to the controller to place the regulator 20 into a sleep mode, in which quiescent current of the regulator 20 reduces to a few uA.

In the sleep mode, the feedback voltage VFB reduces. When the difference between VFB and VREF reduces to the level Vd (FIG. 3A), the ITH voltage starts increasing. When the ITH voltage reaches the sleep threshold voltage ITH_SLP_THRESHOLD, the sleep comparator de-asserts the sleep signal SLEEP (FIG. 3C). The master sleep signal MASTER_SLEEP supplied to the controller is also de-asserted to wake up the regulator 20. Under light load conditions, the regulator would perform a few switching cycles to replenish charge into the output capacitor COUT so as to bring the output voltage VOUT back into regulation.

When the regulator 20 wakes up, the ITH voltage reduces (FIG. 3B). When the ITH voltage falls below the sleep threshold signal, a sleep signal SLEEP (FIG. 3C) is asserted again to return the regulator 20 into a sleep mode. This cycle continues until the input voltage VIN (FIG. 3D) reduces to a level at which the difference between the input voltage VIN and the output voltage VOUT (FIG. 3E) becomes less than the dropout voltage. At this point, the output voltage VOUT significantly reduces and drops out of regulation. When the difference between the input voltage VIN and the output voltage VOUT is less than the dropout voltage, the regulator 20 operates in a dropout mode.

In the dropout mode, a difference between VFB and VREF significantly reduces, and the ITH voltage respectively increases preventing the SLEEP signal from being asserted. It is noted that the VFB voltage may be only a small fraction of the output voltage VOUT. Therefore, changes of a difference between VFB and VREF shown in FIG. 3A do not correspond to changes of VOUT shown in FIG. 3E.

The ITH voltage is supplied to a non-inverting input of an ITH high hysteresis comparator 28 that compares the ITH voltage with an ITH high level threshold ITH_HIGH_THRESHOLD selected to determine when a high level of the ITH voltage prevents the sleep signal SLEEP from being asserted. When the ITH voltage exceeds the ITH high level threshold ITH_HIGH_THRESHOLD, the ITH high comparator 28 asserts an ITH_HIGH signal that enables an input-output (INOUT) low-offset hysteresis comparator 30.

A low pass filter composed of resistor RSW and capacitor CSW is coupled to an inverting input of the INOUT comparator 30 to filter the switch output signal at node SW coupled to the drain of the MOSFET S1. The switch output signal filtered by the low pass filter replicates the output voltage VOUT. The inverting input of the INOUT comparator 30 receives the low pass filtered switch output signal produced at a node between RSW and CSW based on the switch output signal at the node SW. Alternatively, VOUT may be supplied to the inverting input directly from the output node VOUT or may be derived by detecting the duty cycle of the regulator 20. A non-inverting input of the INOUT comparator 30 is supplied with the input voltage VIN.

To conserve energy by reducing quiescent current when the regulator 20 does not operate in a dropout mode, the INOUT comparator 30 is activated by the ITH high comparator 28 only during dropout operation of the regulator 20. When the INOUT comparator 30 is activated, it monitors a difference between the input voltage VIN and the output voltage VOUT to assert a dropout sleep signal DROP_OUT_SLEEP at its output when the decreasing input voltage VIN is larger than the output VOUT by a value less than a predetermined dropout sleep threshold value.

Timing diagrams in FIGS. 3F and 3G illustrate operation of the INOUT comparator 30 in a dropout mode. During dropout, when the switch S1 is on, current in switch S1 multiplied by the switch S1 resistance generates a voltage drop between VIN and VOUT. If this voltage drop is very small, it would mean that the switch current is very low. Thus the controller can go into sleep and allow the output capacitor COUT to provide the load current.

FIG. 3F represents the VOUT-VIN value, and FIG. 3G illustrates the dropout sleep signal produced by the INOUT comparator 30. For example, the dropout sleep signal may be asserted when the VIN is higher than the VOUT by a dropout sleep threshold equal to a value smaller than 50 mV. The dropout sleep signal is supplied to the OR gate 26 that asserts a master sleep signal MASTER_SLEEP provided to the controller to place the regulator 20 into a sleep mode.

In the sleep mode, when the switch S1 is off, VOUT will start falling with the discharge of the output capacitor COUT. When VOUT drops below VIN by a predetermined wake up threshold value, e.g. 50 mV, the INOUT comparator 30 de-asserts the dropout sleep signal to wake up the regulator 20 so as to recharge the output capacitor COUT. This will result in reducing VIN compared to VOUT, and asserting the dropout sleep signal again. This cycle can be repeated until the regulator 20 operates in a dropout mode, i.e. until the difference between the VIN and VOUT is less than the dropout voltage.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A switching regulator for converting an input voltage at an input node to a regulated output voltage at an output node, comprising:
   an inductive element,
   a switch coupled to the inductive element and controlled to produce the regulated output voltage, and
   an input-output comparator configured for comparing a difference between the input voltage and the output voltage, and producing a first sleep signal for placing the regulator into a sleep mode when the regulator is operating in a dropout mode and the difference between the input voltage and the output voltage becomes less than a first predetermined value, the sleep mode being a mode during which the switch is open and not regulating the output voltage and during which power used by circuitry internal to the switching regulator, other than the switch and inductor, is cut or reduced, thereby causing this other internal circuitry to operate with no more than only a very low quiescent current.

2. The switching regulator of claim 1, wherein the input-output comparator is configured for producing a first wake up signal for requesting the regulator to exit the sleep mode, when the difference between the input voltage and the output voltage becomes greater than a second predetermined value.

3. The switching regulator of claim 1 further comprising a sleep comparator configured for comparing a current signal representing a load current of the regulator with a first threshold value, and producing a second sleep signal for placing the regulator into the sleep mode, when the current signal is less than the current threshold value.

4. The switching regulator of claim 3 further comprising a high threshold comparator configured for comparing the current signal with a second current threshold value, and producing an enabling signal for enabling the input-output comparator only when the current signal exceeds the second threshold value.

5. The switching regulator of claim 4 further comprising an error amplifier configured for comparing a signal representing the output voltage with a reference value, and producing the current signal supplied to the sleep comparator and the high threshold comparator.

6. A method of converting an input voltage into a regulated output voltage using a switching regulator, the method comprising the steps of:
controlling a switch to produce the regulated output voltage,
detecting a difference between the input voltage and the output voltage, and producing a first sleep signal for placing the regulator into a sleep mode when the regulator is operating in a dropout mode and the difference between the input voltage and the output voltage becomes less than a first predetermined value, the sleep mode being a mode during which the switch is open and not regulating the output voltage and during which power used by circuitry internal to the switching regulator, other than the switch and inductor, is cut or reduced, thereby causing this other internal circuitry to operate with no more than only a very low quiescent current.

7. The method of claim 6 further comprising the step of producing a wake up signal for requesting the regulator to exit the sleep mode, when the difference between the input voltage and the output voltage becomes greater than a second predetermined value.

8. The method of claim 7 further comprising the step of comparing a current signal representing a load current of the regulator with a first threshold value, and producing a second sleep signal for placing the regulator into the sleep mode, when the current signal is less than the current threshold value.

9. The method of claim 8 further comprising the step of comparing the current signal with a second current threshold value, and producing an enabling signal to enable producing of the first sleep signal only when the current signal exceeds the second threshold value.

10. The method of claim 9 further comprising the step of comparing a signal representing the output voltage with a reference value, and producing the current signal supplied to the sleep comparator and the high threshold comparator.

11. A control circuit for controlling a switching regulator that converts an input voltage to a regulated output voltage and includes an inductive element and a switch coupled to the inductive element and controlled to produce the regulated output voltage, the control circuit including:
an input-output comparator configured for comparing a difference between the input voltage and the output voltage, and producing a first sleep signal for placing the regulator into a sleep mode when the regulator is operating in a dropout mode and the difference between the input voltage and the output voltage becomes less than a first predetermined value, the sleep mode being a mode during which the switch is open and not regulating the output voltage and during which power used by circuitry internal to the switching regulator, other than the switch and inductor, is cut or reduced, thereby causing this other internal circuitry to operate with no more than only a very low quiescent current.

12. The control circuit of claim 11, wherein the input-output comparator is configured for producing a wake up signal for requesting the regulator to exit the sleep mode, when the difference between the input voltage and the output voltage becomes greater than a second predetermined value.

13. The control circuit of claim 12 further comprising a sleep comparator configured for comparing a current signal representing a load current of the regulator with a first threshold value, and producing a second sleep signal for placing the regulator into the sleep mode, when the current signal is less than the current threshold value.

14. The control circuit of claim 13 further comprising a high threshold comparator configured for comparing the current signal with a second current threshold value, and producing an enabling signal for enabling the input-output comparator only when the current signal exceeds the second threshold value.

15. The control circuit of claim 14 further comprising an error amplifier configured for comparing a signal representing the output voltage with a reference value, and producing the current signal supplied to the sleep comparator and the high threshold comparator.

* * * * *